United States Patent [19]

Ingram

[11] 4,286,324
[45] Aug. 25, 1981

[54] PRIME MOVER FUEL EFFICIENCY CONTROL SYSTEM

[76] Inventor: Maxwell Ingram, 230 Anderson St., Hackensack, N.J. 07601

[21] Appl. No.: 78,089

[22] Filed: Sep. 24, 1979

[51] Int. Cl.³ .......................... F02C 9/56; G01L 3/26; G05D 17/02
[52] U.S. Cl. ..................................... 364/442; 73/114; 73/862.28; 60/39.28 P; 364/431
[58] Field of Search ................... 364/431, 442; 73/114, 73/136 A, 136 R; 60/39.28 P; 290/40

[56] References Cited

U.S. PATENT DOCUMENTS

| | | | |
|---|---|---|---|
| 2,982,096 | 5/1961 | Bevers et al. | 60/39.28 P |
| 3,106,062 | 10/1963 | Rosenberg et al. | 60/39.28 P |
| 3,454,752 | 7/1969 | Zavod | 364/431 X |
| 3,533,236 | 10/1970 | Cottington | 60/39.28 |
| 3,729,928 | 5/1973 | Rowen | 60/39.28 P |
| 3,972,224 | 8/1976 | Ingram | 73/114 |
| 4,008,567 | 2/1977 | Hirsch | 60/39.28 P |

*Primary Examiner*—Felix D. Gruber
*Attorney, Agent, or Firm*—Wender, Murase & White

[57] ABSTRACT

A system for determining and controlling the power being transmitted through a rotated shaft from a fuel-consuming engine, which includes a husk assembly associated with the shaft and providing electrical signals proportional to shaft torque, a tachometer for providing electrical signals proportional to shaft rotational speed, electrical circuitry for electronically multiplying the torque signals by the RPM signals to determine shaft horsepower, a dividing network for dividing the shaft horsepower signal into an electrical signal representing the rate of fuel consumption to provide a continuous indication of instantaneous system efficiency, a first control network connected to receive the shaft RPM signals for providing both variable and on-off feedback signals for controlling the speed of the engine and a second control network connected to receive the shaft torque signals for providing both variable and on-off torque control signals for feedback control of the engine to enable the direct supervision of engine operating parameters and automatic control so as to increase fuel efficiency.

12 Claims, 8 Drawing Figures

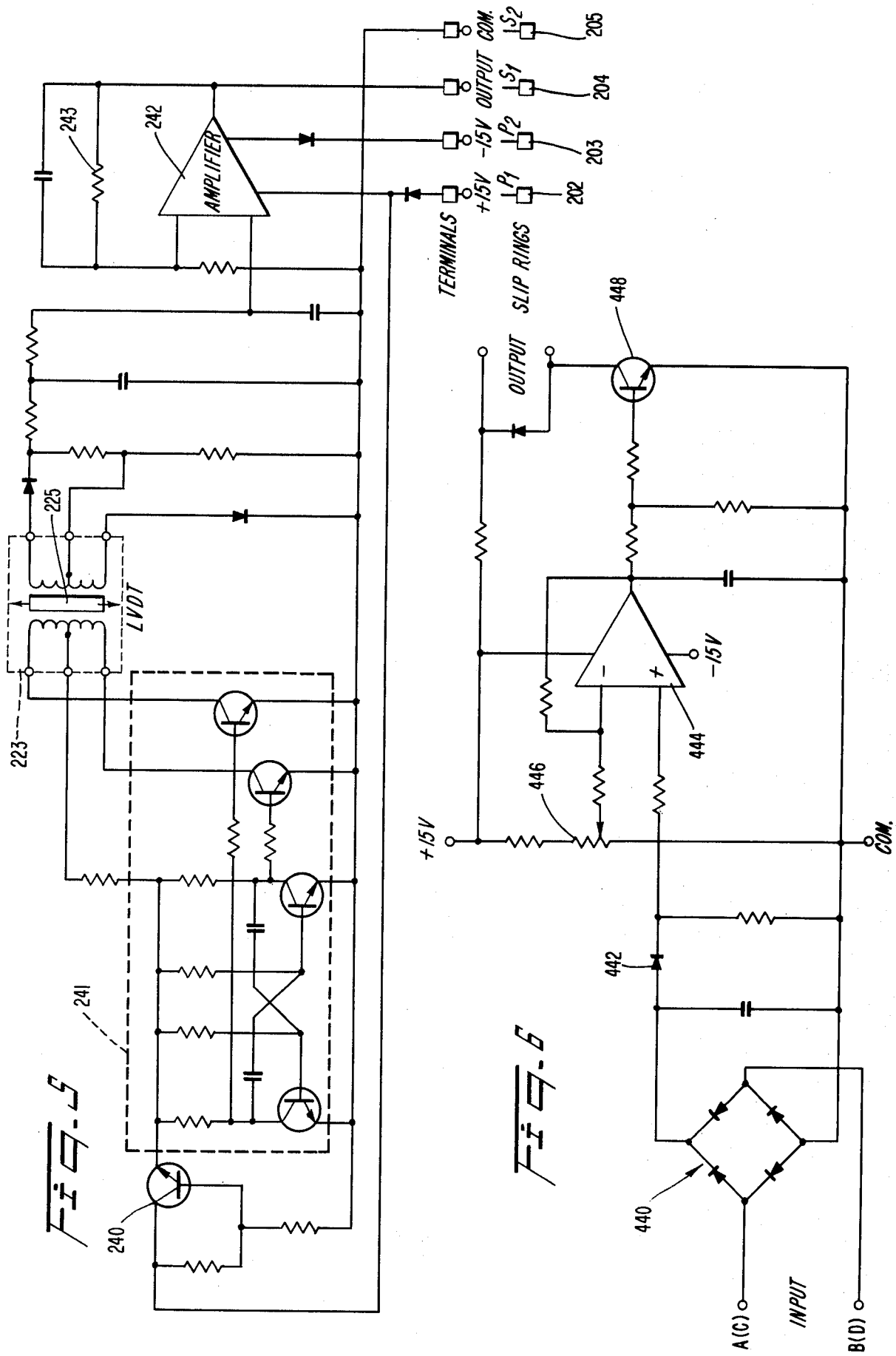

PRIME MOVER FUEL EFFICIENCY CONTROL SYSTEM

BACKGROUND OF THE INVENTION

1. Field of the Invention

The present invention relates to horsepower and efficiency indication and monitoring systems, and more particularly, to automatically programmed apparatus for continuously, electronically supervising and controlling operating parameters of a prime mover so as to enable increased fuel efficiency, and reduced cost of operation for "Optimized Reduced Speed Operation."

2. Description of the Prior Art

Numerous situations exist where a shaft is rotated by an appropriate drive mechanism to perform useful work. Exemplary of the same are electric power plants, industrial machine drive systems, propeller-driven ships and the like. In all of these systems, and in fact in any system in which a powered prime mover causes the power rotation of a driving shaft, it is extremely important to effectively monitor the horsepower being transmitted through the shaft as well as the overall efficiency of the system assembly. Furthermore, it is important to maintain the speed and power being transmitted from the prime mover for the optimum fuel consumption versus power output characteristics to effect a fuel conservation program, or a "Reduced Speed" operation for low fuel rate consumption when conditions dictate slower travel.

In connection with propeller-driven ships, it is extremely important that monitoring equipment simply, yet effectively provide accurate and continuous indications of the horsepower being transmitted through the ship's propeller shafts in order to enable the ship's operating personnel to obtain the optimum performance for developing the maximum output with the least consumption of fuel. While this may be a relatively minor task in connection with small pleasure craft, it becomes a substantial undertaking in connection with large commercial ships such as ocean liners, freighters and tankers. In these latter instances, measurements must be undertaken from one or more engines capable of producing many thousand horsepower and transmitting such power through propeller shafts often many city blocks long and weighing many tons. Yet, these measurements must be accurate, reliable and rapid.

In view of the increasing scarcity of fuel for driving engines such as those used on propeller-driven ships, it is also important to be able to monitor the operating parameters of the ship's engines and to automatically control torque and RPM so as to provide the lowest "Specific Fuel Rate" value comparable to the maximum power output at the minimum fuel consumption level. A small change in propeller RPM causes a relatively greater change in SHP power and a significant variation in fuel consumption.

On both ship and shore based prime mover power equipment, a propulsion panel is generally employed for operating and controlling the speed and direction of the prime mover, whether it be diesel, steam turbine, or gas turbine (jet engine). The propulsion panel may perform its function by penumatic logic, hydraulic logic, electrical control, electro-mechanical control or microprocessor control.

In the past, propulsion panel control has been regulated directly and manually by an operator in response to the operator's observations of engine operation. In order to maximize or optimize fuel efficiency, it is required that some provision be provided to more accurately regulate engine operation consistent with actual, on-going measurements of torque and RPM in consideration of weather conditions, schedules, tides, docking cargo and fuel costs. The need for such automated control is apparent from an appreciation of the fact that the most engine efficient power output is not achieved merely by selecting maximum torque and maximum RPM, but is dependent upon combinations of both torque and RPM values, taken together with actual measurements of fuel consumption.

In my prior U.S. Pat. Nos. 3,274,826; 3,960,012; and 3,972,224, systems are disclosed for providing rapid and accurate measurement of shaft horsepower and efficiency. However, the prior art does not show systems for developing both on-off and variable feedback control of shaft rotational speed or both on-off and variable feedback control of torque for affecting the highest efficiency and fuel economy of operation.

SUMMARY OF THE INVENTION

It is, therefore, an object of the present invention to continuously, accurately and effectively determine and provide a perceptible readout of the actual horsepower output through the powered shaft of a prime mover, such as the propeller shaft of a ship, as well as overall system efficiency or fuel rated economy, while at the same time deriving RPM and torque feedback control systems to effect maximum fuel conservation.

The present invention, in one aspect, can be summarized in that a system for determining and controlling the power being transmitted through a rotated shaft includes a first assembly coupled with the shaft for generating a direct current signal proportional to torque, a second assembly coupled with the shaft for generating a direct current signal proportional to shaft RPM an electronic circuit for multiplying the torque and RPM signals to produce a direct current signal representative of horsepower transmitted through the shaft, and control means for producing signals representative of torque and/or RPM for controlling the torque and/or RPM settings of the system engine.

Another object of this invention is to construct a totally electronic horsepower—and efficiency-monitoring engine control system having improved operational characteristics and capable of integrated circuit fabrication.

The present invention provides several improvements and advantages over the prior art in that all computations are electronic, direct, and automatic, that high precision readings are facilitated, that alarm signals are provided to warn against overtorque and overspeed conditions of operation, that both variable and on-off feedback signals are derived representative of torque and RPM to control engine operation, and that improved operating characteristics are exhibited.

These and other objects and advantages of the present invention will be more fully appreciated when taken in conjunction with the accompanying detailed description of a preferred embodiment and the attached drawings.

BRIEF DESCRIPTION OF THE DRAWINGS

FIG. 5 is a schematic diagram of the electrical circuit of the husk assembly of FIG. 1; and FIG. 6 is a schematic diagram of the torque comparator and RPM comparator circuits of FIG. 2.

DETAILED DESCRIPTION OF THE INVENTION

Figure 1:
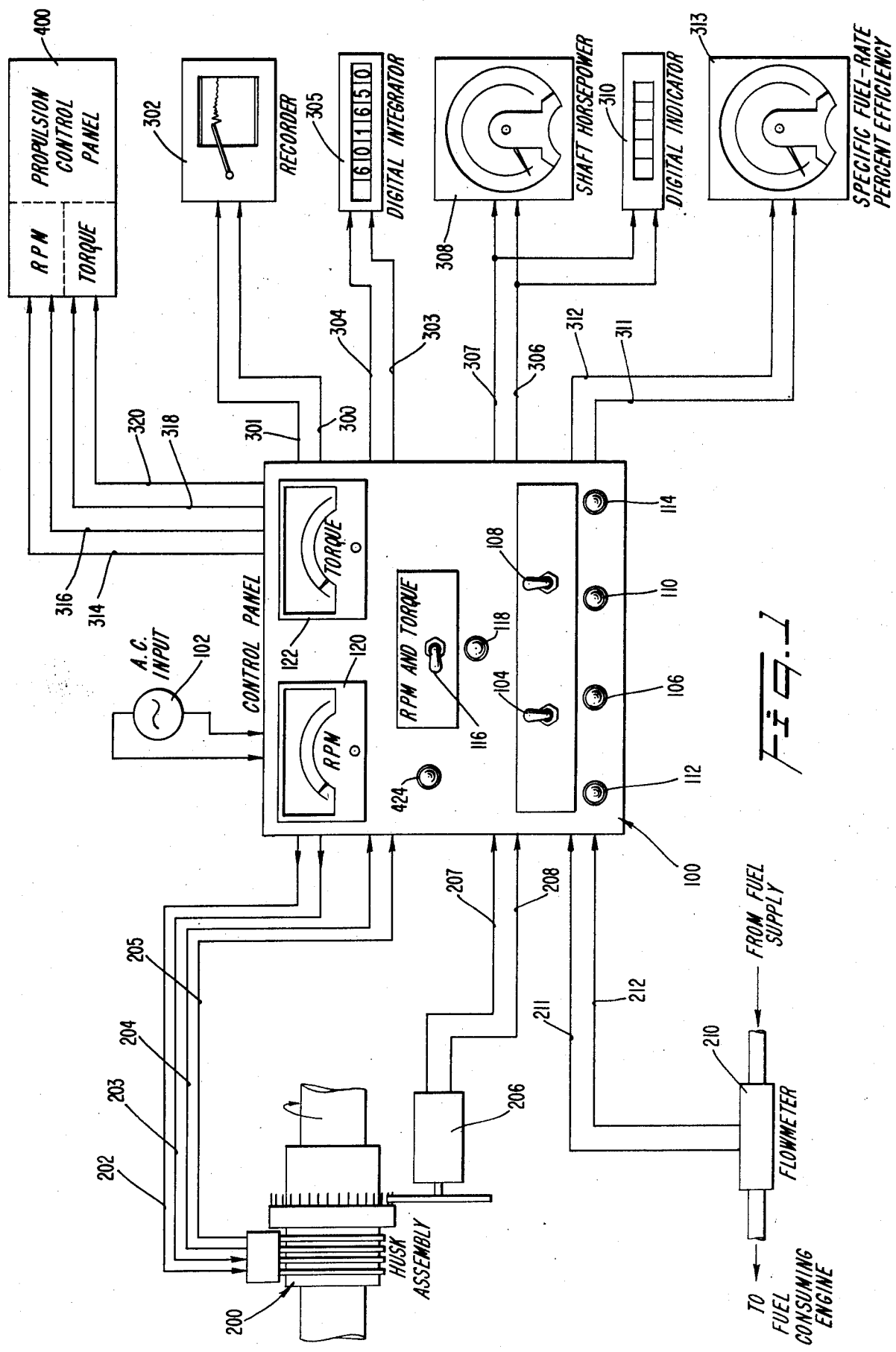
FIG. 1 is a diagrammatic view of a preferred embodiment of a system according to the present invention.

While the present invention has utility in connection with any number of various systems in which it may be desired to determine, indicate, and record the shaft horsepower and/or instantaneous specific fuel rate of a prime mover driven rotated shaft, for exemplary purposes only, the invention will be described and illustrated herein in conjunction with a preferred embodiment adapted specifically for use in connection with the monitoring and controlling of a propeller-driven ship engine. It is therefore to be understood that the present invention is not limited or restricted to any one particular system, but is intended for use generally for the purpose of determining the horsepower delivered by any powered shaft and the efficiency of the prime mover associated therewith and for the purpose of controlling torque and/or RPM operating conditions.

The theory of operation of the horsepower and specific fuel consumption measurement portions of the system in accordance with the present invention is described in my U.S. Pat. Nos. 3,960,012 and 3,972,224. To briefly summarize, the measurement of the shaft horsepower developed in the driven shaft from an engine, namely, the propeller shaft in a ship, can be obtained by measuring the RPM of the shaft and multiplying the derived signal by a signal representing the torque being transmitted through the shaft. In deriving torque, a husk assembly is used which fits about the shaft. The husk assembly measures the twisting of the shaft caused by the transmission of torque from the engine to the ship's propeller. This twisting is representative of torque, and precise torque calculations can be made once the modulus of rigidity of the shaft material is known.

In addition to the foregoing, the signal derived by the multiplying circuit is also fed to the denominator input of a dividing circuit. The dividing circuit receives at its numerator input a direct current signal proportional to the instantaneous rate of fuel flow. The dividing network is preferably constructed of solid state components and accurately and continuously computes a rate of fuel flow per shaft horsepower so as to indicate the instantaneous specific fuel rate or system efficiency of the apparatus under examination.

The circuit according to the present invention also enables the derivation of control signals for controlling both torque and RPM of the ship's engines. An overtorque alarm and torque control circuit is used to derive a signal which can be used to maintain a preset torque reflecting power demand for a specific propeller speed in RPM for the ultimate in fuel conservation and economy. Similarly, a preset maximum RPM, prescribed for optimum fuel conservation, may be obtained and maintained by providing an RPM feedback signal to the propulsion control panel of the overall system. Not only does this provide the maximum fuel conservation, but it also assures that the engine will not be driven to excessive and self-destructive overspeed and/or overtorque causing damage to machinery, propeller or shaft.

Turning now to FIG. 1, the overall system in accordance with the present invention is diagrammatically illustrated and includes a control panel 100 housing all of the primary electrical circuitry, controls and indicator lamps, for operating the system. Power for the system is derived from a suitable source of AC operating potential 102 which is fed through an on-off control switch 104 to the rest of the circuit. A power indicator lamp 106 apprises an operator of the operating status of the system. The control panel also includes a switch 108 having a first position for normal system operation and a second position substituting preselected calibration signals to the system meters. Positioning of switch 108 into the second position is indicated by appropriate alarm indicator 110 mounted on the panel next to switch 108.

An overtorque alarm lamp 112 and an astern torque indicator 114 are also mounted on the panel to inform the operator of these eventualities. Also, another switch 116 allows both RPM and torque signals to be reversed in polarity, reversal being indicated by an "astern" indicator lamp 118. RPM and torque meters 120 and 122, respectively, are calibrated for direct readout of the RPM and torque signals of the system, and may be used for system calibration. An additional indicator in the form of alarm lamp 424 is provided to indicate that a preset maximum RPM condition has been exceeded.

Three distinct input signals are provided to the circuitry housed within the control panel 100. The first is derived from a husk assembly 200 which receives regulated DC operating potential along lines 202 and 203 and applies the same through a brush and slipring assembly to a twist detection network which produces direct current signals on lines 204 and 205 representative of system torque. The husk assembly 200 is disclosed in detail in my earlier U.S. Pat. No. 3,960,012 which is specifically incorporated herein by reference.

Mechanically coupled to the rotating shaft at the husk assembly 200 is a tachometer generator 206 which provides a direct current output signal on lines 207 and 208 representative of shaft RPM. Also, a flow meter 210, of any suitable construction, is interposed in a main fuel supply line for the ship's propulsion engine and delivers a DC output signal on lines 211 and 212 which is directly proportional to and representative of the rate of fuel flow to the engine. The output signals on lines 204-205, 207-208, and 211-212, which are representative of torque, RPM, and fuel consumption, respectively, are all connected to the control panel assembly through appropriate interconnecting cables for subsequent electronic processing.

Circuitry in the control panel, as will be described more fully below, processes the input signals fed thereto so as to derive output signals representative of shaft horsepower, instantaneous specific fuel rate for efficiency, shaft torque, shaft overtorque to prevent damage to machinery and shaft, shaft rotational speed, and excessive shaft speed.

Signals representative of shaft horsepower are coupled via lines 300 and 301 to a strip chart recorder 302 which, as is well known, includes an elongated sheet of graph paper driven at a constant speed and cooperating with a pen moved in response to the amplitude of received signals to provide a permanent recording of variations in shaft horsepower versus time. It is also noted that recorder 302 may contain any number of pens, with different colored ink, each being connected to receive input signals representative of the horsepower within plural shafts of the ship for providing a continuous permanent record of simultaneous horsepower readings of the plural shafts.

The shaft horsepower signal is also fed via lines 303 and 304 to a digital integrator 305 which integrates or totalizes such input signals and provides a direct digital read-out of shaft horsepower-hours. This measurement is particularly useful in making long-term analyses of overall system efficiency. For example, the totalized read-out of the digital integrator 305 after one hour of ship operation may be divided into the number of pounds of fuel which were consumed during that hour to readily determine the average Specific Fuel Rate representing plant efficiency during that period.

Of course, the shaft horsepower signals are in addition fed over lines 306 and 307 to an analog shaft horsepower indicator meter 308 having a calibrated dial for direct read-out of shaft horsepower. While analog meter 308 is particularly advantageous when it is desired not only to read-out shaft horsepower but to rapidly enable visual perception of shaft horsepower fluctuation with time, greater accuracy in actual shaft horsepower read-out can be achieved by using any suitable digital indicator 310 either in parallel with or in lieu of the analog meter 308.

In addition to the above indicators for providing various read-outs of shaft horsepower, the control panel circuitry also electronically computes instantaneous specific fuel rate or system efficiency by electronically dividing the rate of fuel consumption signal by the shaft horsepower signal and generating a DC output signal in response thereto. This output signal is applied over lines 311 and 312 to a Specific Fuel Rate indicator 313. The specific rate indicator provides an analog read-out of instantaneous specific fuel rate or system efficiency and includes two calibrated scales, with such calibration obtained by comparison of actual measured data with theoretical or expected read-outs.

The circuitry on control panel 100 also derives a variable voltage output signal on line 314 which represents shaft RPM. On line 316 is provided an on-off circuit signal which is normally off and is switched on whenever the shaft RPM exceeds a preselected maximum level. Similarly, a variable voltage signal representative of torque transmitted through the shaft is provided on output line 318, while line 320 carries an on-off circuit signal which is switched on whenever the torque excees a predetermined level. All four of the signals on lines 314, 316, 318 and 320 are fed to respective control inputs of the propulsion control panel 400 of the engine. The structural details of the propulsion control panel 400 are well known to those of ordinary skill in the art and, thus, are not discussed herein for the sake of brevity. However, it is believed helpful to discuss the various propulsion control options used for different types of prime mover systems.

On ship and shore-based prime mover power equipment, the propulsion panel is employed for operating and controlling the speed and direction of the prime mover power plant. The propulsion panel may perform its function by pneumatic logic, hydraulic logic, electrical control, electro-mechanical control, or microprocessor control.

In the cases of pneumatic, hydraulic, electrical and electro-mechanical controls, an adjustable preset maximum RPM and torque can be maintained by supplying an appropriate input signal whenever the desired maximum RPM and torque levels exceed established thresholds. In cases where pneumatic logic, electrical, electro-mechanical and microprocessor controls are used, a variable voltage signal input is provided for receiving a variable DC voltage which directly controls both RPM and torque normally below the preset maximum threshold alarm and reaction position. This provides infinite resolution of RPM and torque control and enables the supply of a suitably derived feedback signal forming a closed loop to maximize overall fuel efficiency. Within the propulsion panels themselves are responsive feedback systems that actuate the engines upward in speed and torque until the appropriate level is obtained and maintained subject to the value of the variable input signals.

To convert an electrical variable signal voltage, an electrical to pneumatic transducer is sometimes employed to provide a linear pneumatic output in response to the electrical input signal. This allows control of the pneumatic logic circuits as appropriate. The transducer may take the form of a needle valve which is electromagnetically controlled to regulate air flow in response to an electrical input. Such a transducer is capable of providing a linear conversion of the electrical input signal to a pneumatic output signal for both torque and RPM control.

In the case of electrical, electro-mechanical and microprocessor propulsion panels, the input signal voltage may be directly connected without the use of any intermediate transducer. In order to avoid degrading or damage to the primary RPM and torque signal voltages from outside sources, spurious signals and reverse voltages, both variable RPM and variable torque signals are derived and protected by using a buffer operational amplifier, as will be more completely described below.

The speed control signals provided on lines 314 and 316 optimize propeller speed in RPM to propel the ship at a prescribed rate of speed through the water. The torque control signals, whether variable on line 318 or "on-off" on line 320, control the torque through the amount of fuel fed into a diesel engine. Torque control also can be accomplished by cam shifting or positioning of the fuel oil rack mechanism which changes the nozzle orifices in the fuel oil nozzle injectors. In steam propelled ships, the torque signal may be used to control the steam pressure into the steam nozzles driving the steam turbine. In gas turbines, the torque is controlled by opening of the fuel valve providing necessary thrust to drive the free turbine connected to the propeller through a reduction gear.

In some ships, particularly with gas turbines, a controllable pitch propeller is employed in which the torque developed and expended is accomplished by feathering the blades of the propeller. The torque developed then becomes a direct function of the pitch angle. In the controllable pitch propeller, the shaft always runs in one direction; however, the ship direction is reversed by varying the pitch angle through zero into the opposite direction. Both torque and RPM are controlled by the variable signal voltages in such a case.

Figure 2A:
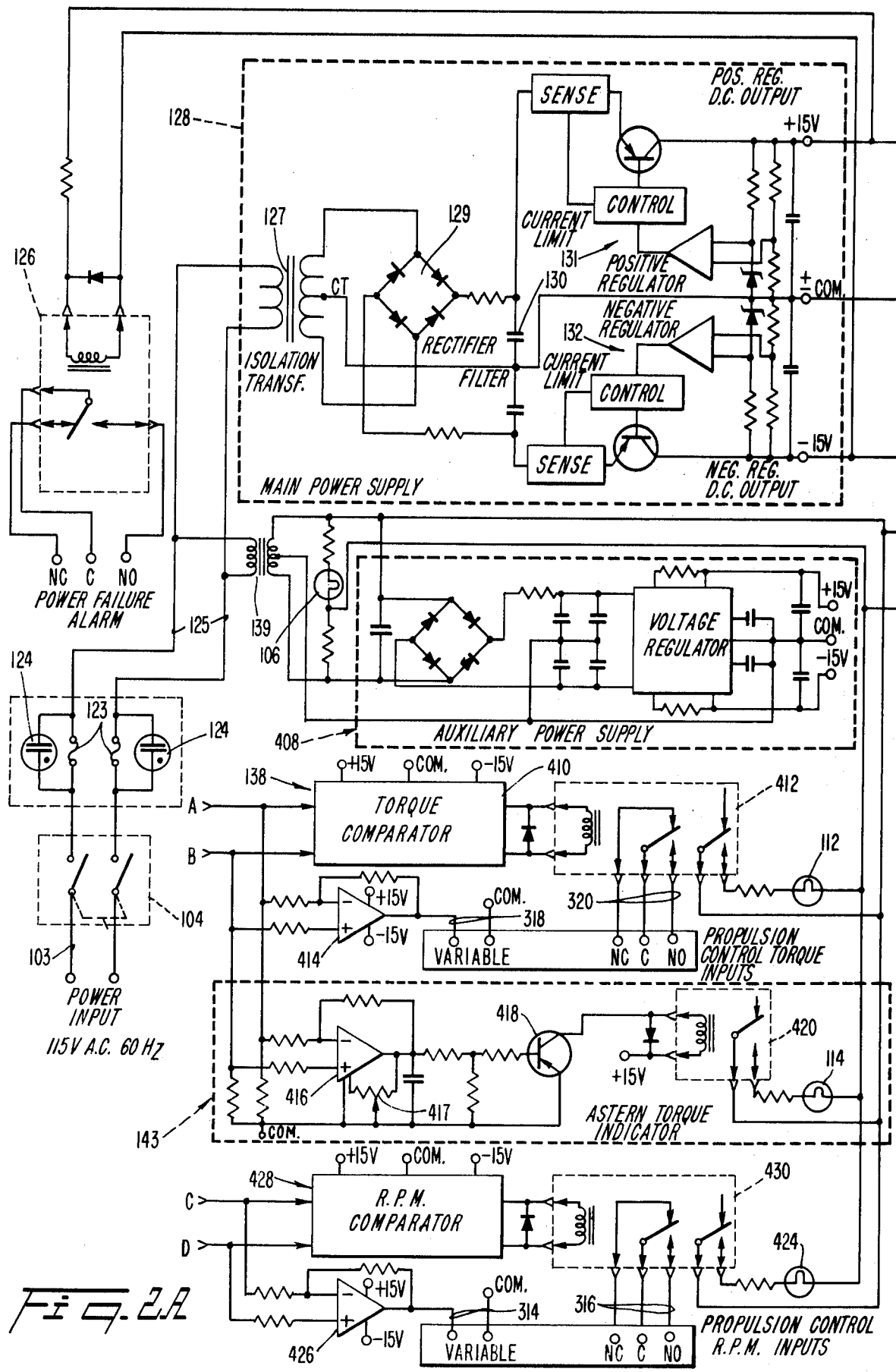
FIGS. 2A, 2B and 2C are schematic diagrams which, taken together, illustrate the electrical circuit of the system according to the present invention.
Figure 2B:
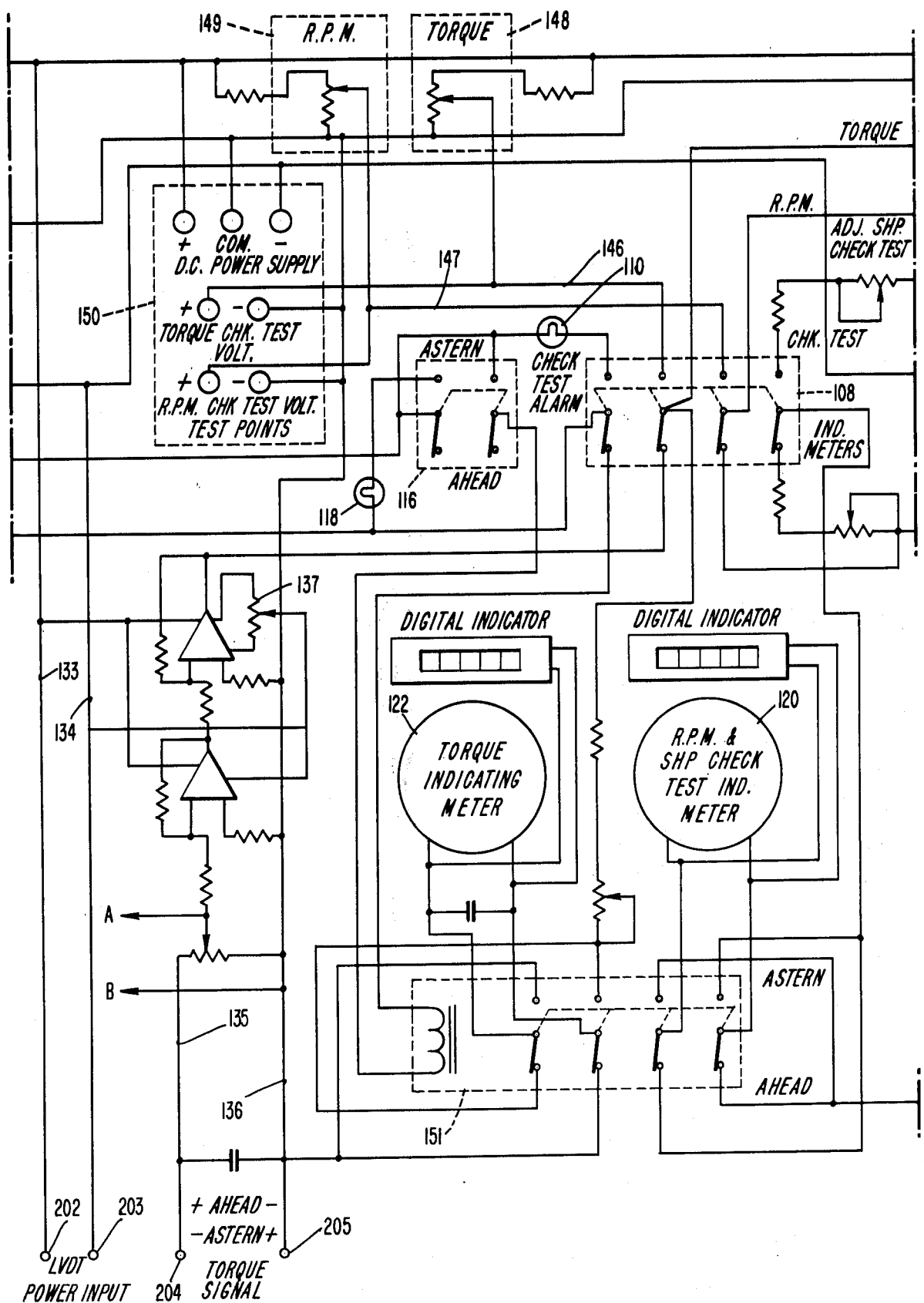
Figure 2C:
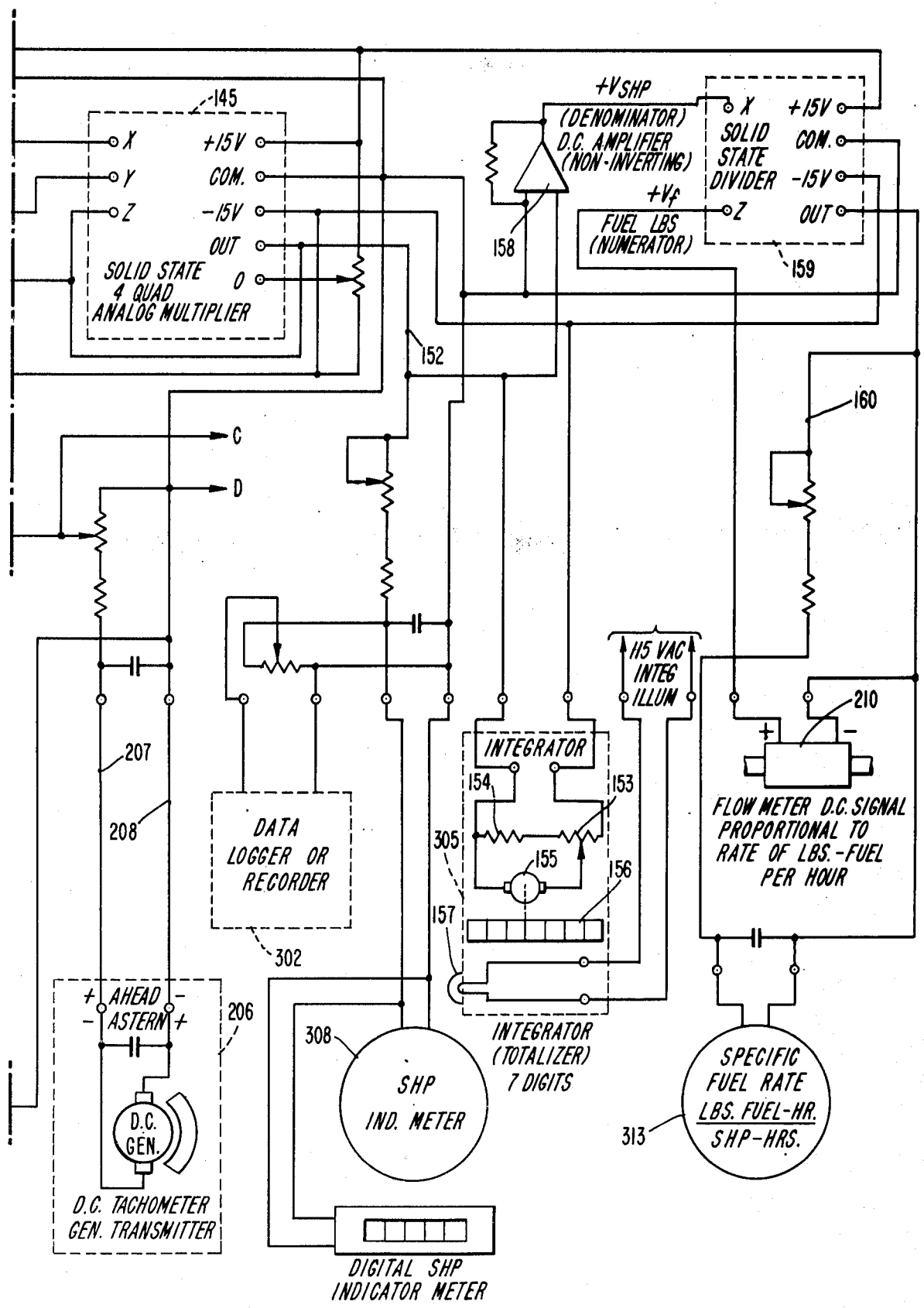

Turning now to FIGS. 2A, 2B and 2C, power from AC source 102 is applied by lines 103 through power switch 104 to a pair of fuses 123. Neon indicator lamps 124 are connected in parallel with fuses 123 to indicate the occurrence of a blown fuse. The other side of the pair of fuses 123 is connected to main AC power lines 125 which feeds the input windings of an isolation transformer 127 in a voltage regulated DC power supply identified generally as 128. The output of transformer 127 is fed through a rectifier network 129 and a bank of filter condensers 130 to two identical solid state regulator networks 131 and 132. Three output terminals are therefore prvided one supplying positive 15 volts DC, one supplying negative 15 volts DC and the other acting as common for both positive and negative terminals. Power supply 128 supplies a very accurately regulated DC output signal so as to facilitate accurate measurements within the system. The regulator 128 in cooperation with isolation transformer 127 effectively shields the entire system from inaccuracy and disturbances frequently encountered in the AC power supplies on board a ship.

The plus and minus 15 volt DC output of main power supply 128 are connected to a pair of lines to the coil of a power failure relay 126. The coil of relay 126 is appropriately protected by a diode as illustrated in FIG. 2A. By connecting the coil of relay 126 to the output of main DC power supply 128, a failure in the AC input or in the main power supply will cause an alarm to be sounded.

The plus and minus 15 volt DC output terminals of the regulator 128 are respectively connected via lines 133 and 134 to two of the brushes of the husk assembly. As will be discussed below, the DC operating potential on lines 133 and 134 is fed to activate the circuitry within the husk assembly which thereafter generates a fluctuating DC signal fed through brushes to lines 135 and 136 and proportional to shaft torque. The torque DC signal, with magnitude and polarity proportional to the amplitude and direction of shaft torque, is fed over lines 135 and 136 to a potentiometer 137 which enables preselection of an overtorque threshold for actuating an overtorque alarm circuit generally indicated at 138. Overtorque alarm lamp 112 is connected through the contacts of a relay 412 in circuit 138 across the secondary of a transformer 139 so as to become energized upon actuation of the relay. The secondary of transformer 139, which is center-tapped, as illustrated, also supplies through a resistor network the main power supply lamp 106. The output of transformer 139 also supplies the input of an auxiliary power supply 408. The auxiliary power supply 408 includes a diode bridge rectifier which feeds a bank of filter capacitors supplying a semiconductor or solid state voltage regulator. The voltage regulator may be of any suitable type such as Motorola Mc 1568. This type of voltage regulator system is more precise and maintains regulation much closer and stable despite both input line voltage and load variations. The auxiliary power supply 408 supplies both positive 15 volt DC and negative 15 volt DC outputs as well as a common center terminal which is also conntècted to the center-tap of the secondary of transformer 139. The output terminals of the auxiliary power supply are connected to various torque and RPM control circuits, to be described below, and it should be appreciated that direct circuit connections are represented by labeled terminals rather than by direct wiring purely for the sake of simplicity and clarity of presentation.

The torque signal from the husk assembly is fed through lines A and B to the inputs of a torque comparator circuit 410 within the overtorque alarm network 138. The torque comparator circuit, as will be described more completely below, receives operating potential from the auxiliary power supply 408 and compares the torque signal irrespective of polarity into bridge rectifier 440 in lines A and B to a preselected reference value adjusted at 446 against a torque calibrated scale. Whenever the torque signal exceeds the reference signal, an output is provided to drive the coil of the torque output relay 412. The coil is appropriately protected by a diode and includes two switches, one for controlling the alarm indicator lamp 112 and/or audible device and one for providing on-off outputs 320 to the propulsion control panel 400 for prompt automatic remedial action into the propulsion panel.

The torque signals on lines A and B are also fed through a buffer operational amplifier 414 to provide a linear variable voltage DC signal on lines 318 having polarities corresponding to "ahead" and "astern" directions and representative of prevailing system torque. The variable voltage signal on line 318 is fed to the propulsion control panel 400 so as to provide stepless or infinitely variable control of system torque.

The torque signal on lines A and B is also fed to an astern torque indicator network shown generally at 143. The astern torque indicator includes a differential amplifier 416 which is very sensitive and accurately responds instantly to a very small signal with reversal in polarity in the astern input signals only, so as to generate an amplified output which is used to control a transistor switch 418. The transistor 418, in turn, controls the diode protected operating coil of a relay 420 having a set of switches coupled to control an astern torque indicator lamp 114. The differential amplifier 416 has a null offset potentiometer 417 adjusted to provide an astern signal exactly when it becomes evident.

The astern torque indicator network 143 has a high input impedance, operates unidirectionally with corresponding astern polarity, and does not require the provision of omnidirectional bridge input diodes. The relay 420 will be operated only when the torque signal changes in polarity to match the input polarities of the differential operational amplifier, for conduction. This will feed an amplified signal into the transistor to actuate the relay precisely when any negative or astern torque is present.

Output signals from the husk assembly on lines 135 and 136 as well as the output signals provided by the DC tachometer generator 206 on lines 207 and 208 are fed through suitable level setting potentiometers to the x and y inputs of a solid state four-quadrant analog multiplier 145. The torque signals preferably are fed through dual operational amplifiers in series in order to provide for automatic matching of input impedances to retain the same input polarity relationship to the RPM signal, and to assure linearity in the torque signal applied to the multiplier. The first of the dual amplifiers is a buffer for polarity reversal only while the second of the operational amplifiers reverses polarity and amplifies the torque signal to increase sensitivity and, as noted above, effectively compensate for correct impedance matching into the multiplier. Also, potentiometer 137 (FIG. 2B) provides a null offset into the second operational amplifier to allow the development of a zero voltage output whenever the husk torque input signal is zero. By this arrangement, a more sensitive and linear torque signal is developed for the system. The torque and RPM signals are supplied to the multiplier 145 through switch 108 which, in the position illustrated, provides direct interconnection of the signals to the multiplier. In a check test position, switch 108 disconnects the input signals from the husk assembly and tachometer generator and substitutes therefor signals on lines 146 and 147, respectively, from torque and RPM adjusting potentiometers 148 and 149 which are respectively connected to the main power supply 128. This allows preselected or standardized test voltages to be readily and conviently provided as inputs to the multiplier 145 for calibration and test purposes. The various signals including the power supply voltage, the torque check test voltage, and the RPM check test voltage may also be examined by external meter means via the test point panel 150 provided within the control panel.

Switch 116 is connected to supply the stepped down AC output of transformer 139 to the operating coil of a reversing relay 151. In the position illustrated, switch 116 isolates coil of relay 151 from transformer 139 whereupon relay 151 assumes its normal or quiescent state as shown. In this state, torque and RPM signals on lines 135-136 and 207-208 are directly connected to the torque indicating and RPM indicating meters 122 and 120, respectively. When switch 116 is moved to its astern position, AC potential from transformer 139 is fed to the coil of relay 151 actuating the same and causing reversal of the connections to the torque and RPM indicating meters 122 and 120.

The leftmost pole of check test switch 108, as illustrated, is interposed in one side of the supply connections between transformer 139 and the coil of relay 151 such that transposition of the switch 108 to the check test position immediately causes relay 151 to revert to its normal or quiescent state regardless of the position of switch 116. After check test measurements and adjustments are made, and the switch 108 is moved back to its indicating position, the meters 122 and 120 are connected again in accordance with the ahead or astern position selected by switch 116. It is further noted that lamp 118 is connected across the output of transformer 139 through an additional set of contacts of switch 116 so as to become illuminated whenever switch 116 is in the astern position. Check test alarm lamp 110 is similarly connected through switch 116. The output of the solid state multiplier 145 is a fed by a line 152 to the data logger or recorder 302, the shaft horsepower indicator meter 308 and the digital integrator 305. Integrator 305 includes a potentiometer 153 connected in series with a resistor 154 across a DC motor 155. The output shaft of the DC motor 155, which rotates in proportion to the amplitude of the input potential, drives a seven digit decade counter 156. An illuminating lamp 157 is connected to the output of transformer 139 so as to facilitate visual perception of the totalized shaft horsepower-hours appearing on the decade counter 156.

While the integrator assembly 305 has been illustrated as a voltage-speed timing motor for integrating and totalizing the shaft horsepower-hours to compare the same against comparable fuel consumed over the same period of time, it should be appreciated that any appropriate assembly may be utilized, such as a velocity/time servomotor coupled to a mechanical digital counter to read-out shaft horsepower-hours.

The DC output signal on line 152, which is directly proportional to and is representative of shaft horsepower, is also applied through a non-inverting DC amplifier 158 to the denominator input x of a solid state divider network 159. The numerator input z of divider 159 receives the unidirectional direct current output signal of the flow meter 210 whereupon the divider produces a DC output signal on line 160 which is representative of the instantaneous specific fuel rate or overall efficiency of the ship's propulsion system. The signal on line 160 is fed through a potentiometer adjusting network to the specific fuel rate meter 313 so as to provide a continuous indication of instantaneous system efficiency during operation.

The system according to the present invention includes as a basic feature the derivation of RPM control signals for controlling the speed of operation of the ship's engine as part of an overall plan to maximize efficiency and minimize fuel consumption. To this end, signals on lines C and D, representing shaft rotational speed as measured by the DC tachometer generator, are fed to a buffer operational amplifier 426 (FIG. 2A). The operational amplifier 426 receives operating potential from the auxiliary power supply 408 and produces, at its output, a linear variable direct current signal having polarities corresponding to "ahead" and "astern" directions and representative of the prevailing shaft rotational speed. The variable RPM signal is adapted to be coupled to the propulsion control panel 400 via line 314.

The shaft rotation signals on lines C and D are also fed to the input terminals of an RPM comparator 428 which receives operating potential from the auxiliary power supply 408 and drives a diode protected relay 430 in a manner identical to that of the torque comparator 410 and relay 412, described above. The relay 430 has a first set of switch contacts used to control alarm lamp 424 and/or an audible device (not shown), and a second set of switch contacts which are fed via lines 316 to the propulsion control panel 400 where they may be connected to appropriate on-off RPM control input terminals for prompt automatic remedial action.

In operation, the RPM comparator 428 receives the shaft rotation speed signals from lines C and D and compares the same to a preselected reference level against a calibrated RPM scale. Whenever the measured signal exceeds the preselected threshold, the relay 430 is actuated so as to indicate via alarm lamp 424 that an excessive speed has been reached by the engine and for prompt automatic remedial action into the propulsion panel. In this manner, damage to the engine caused by prolonged operation in excess of maximum rated speeds can be easily avoided.

Figure 3:
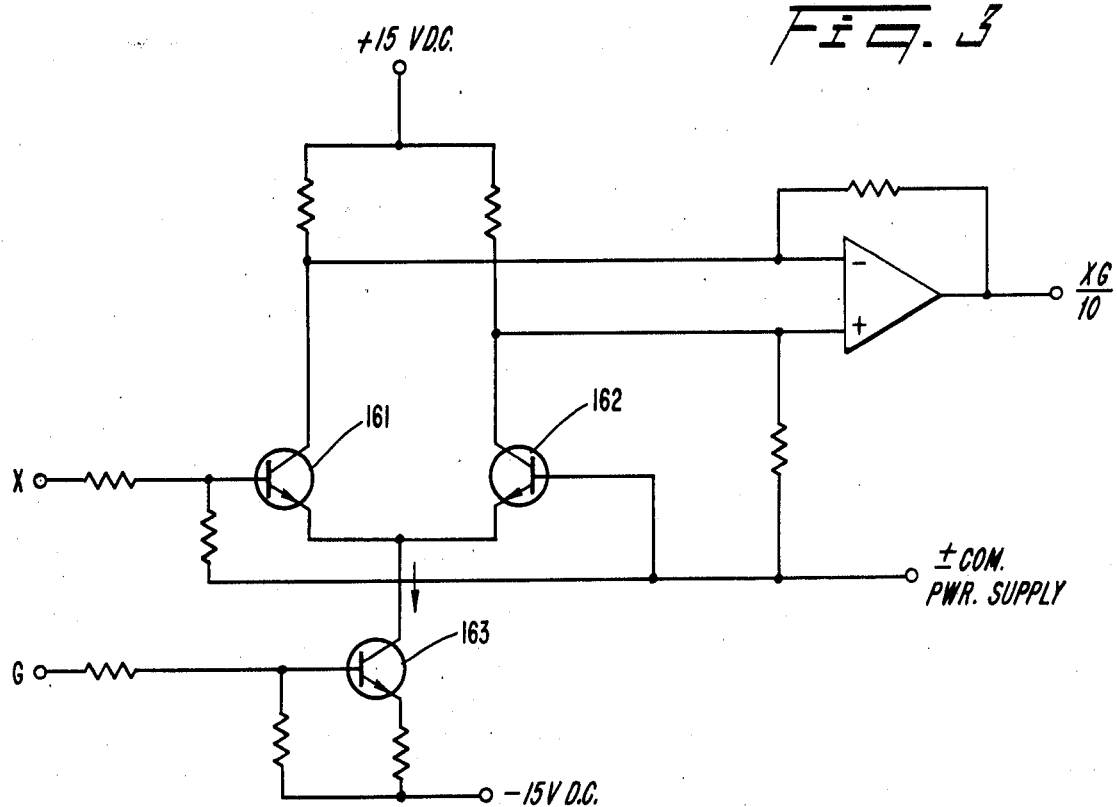
FIG. 3 is a schematic diagram of the multiplier of the circuit of FIG. 2.

Referring now to FIG. 3, an exemplary circuit for multiplier 145 is shown and is of the variable transconductance type. Circuits of this general type are well known, and a detailed description is omitted for the sake of brevity. However, it is noted that the variable transconductance multiplier of FIG. 3 produces the product of input signals by varying the transconductance of the transistors 161 and 162 so as to modulate the emitter current of transistor 163. Since the transconductance value of a transistor is proportional to the relative amount of collector current flowing therethrough, the voltage gain of a transistorized differential amplifier can be varied in accordance with such emitter current. Therefore, the cooperative interaction of transistors 161, 162 and 163 results in the provision of an output signal directly related to the product of the two input signals applied to the network.

Figure 4:
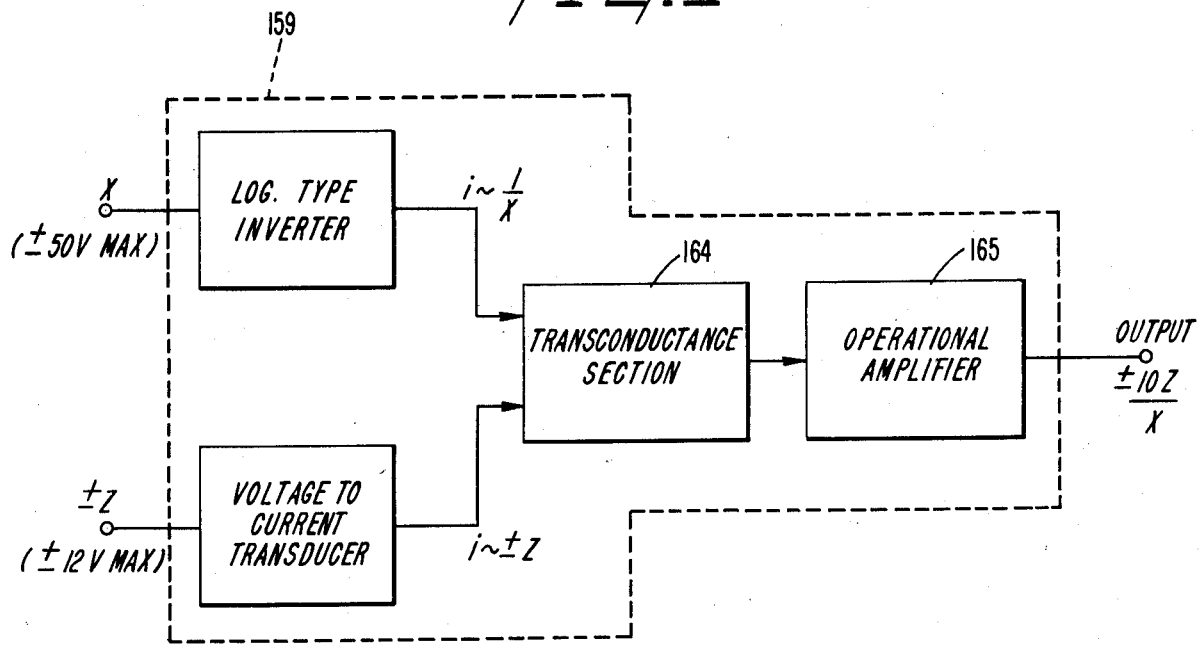
FIG. 4 is a block diagram of the divider network of the circuit of FIG. 2.

As shown in FIG. 4, the divider network 159 is basically similar to the multiplier circuit of network 145 and, thus, is shown in block form only. The x and z inputs to the divider 159 are applied respectively to a log-type inverter and a voltage to current transducer which provide output signals to a transconductance section 164. The output of the transconductance section is applied through an operational amplifier 165 as the dividend of the division z/x.

The husk assembly circuitry is shown in schematic form in FIG. 5 and includes a polarity reversal protecting transistor 240 which receives the direct current supply from the regulated power supply 128 and supplies operating power to an oscillator circuit 241 which utilizes a transistorized chopper to energize the primary winding of the linear variable differential transformer 223 with an alternating current having a frequency of between 2500 to 10,000 Hz. The coaxial position of the core 225 determines the gradient of voltage induced into each of the illustrated secondary windings. Each of the two secondary windings are connected to a demodulator which consists of two single rectifiers for half-wave rectification terminating in an RC filter section. The secondary windings are connected in series for rectified voltage opposition so that the resulting differential between the two secondaries is a polarity selective direct current voltage proportional to the core displacement from the electrical null position. The differential output is connected to an operational amplifier 242 characterized in that the output of the amplifier has a polarity dependent upon which of the input terminals receives the higher positive polarity voltage. The amplifier 242 is thus both inverting and non-inverting dependent upon the magnitude of the signals supplied as inputs thereto.

The magnitude of voltage amplification of amplifier 242 is dependent upon the resistance in the feedback resistor 243. Thus, the output of amplifier 242 is a voltage which is directly proportional to torque and the polarity is a function of relative core positioning with respect to a central position. The direct current output voltage signal of the amplifier 242 is then applied over lines 204 and 205 to leads 135 and 136 of the control panel. With shaft reversal, both the RPM and torque polarities reverse simultaneously and correspond to each other to produce upscale read-outs.

FIG. 6 is a schematic diagram of the torque voltage comparator circuit 410 used in the present system. The RPM comparator 428 is identical in every respect and operates in the identical manner. The input terminals of the comparator circuit are fed through a diode bridge network 440 so as to enable comparisons to be made on the system regardless of voltage polarities whether it is measuring ahead or astern torque or forward or reverse RPM. The output of the rectifier network 440 is fed through diode 442 to one input of a differential amplifier 444 which receives operating potential from the auxiliary power supply 408, as shown. The second input of differential amplifier 444 receives a DC reference signal through a voltage regulated source including a potentiometer 446 which may be adjusted against a calibrated RPM scale to preselect the desired threshold level or comparison value. Whenever the input to the first input terminal of differential amplifier 444 exceeds the preselected reference level, the op-amp conducts and develops an amplified output signal. The output signal is fed through appropriate coupling resistors to the base of a transistor switch 448. The transistor 448 has its collector-emitter path coupled in series with output terminals across the positive 15 volt supply so as to drive the control relay connected at the output whenever the input exceeds the preset reference level.

From the foregoing, it can be appreciated that the present invention provides a system having improved operational characteristics over prior art systems and, importantly, further enables the derivation of variable voltage control signals for directly controlling engine RPM and torque as part of an effective total fuel conservation program. By utilizing the present system, in overall combination, the operator of a prime mover is enabled to effectively monitor the horsepower being delivered to the load, the specific fuel efficiency of the system, while at the same time providing direct input control to the propulsion panel of the engine. In this manner, the engine may be supervised and controlled to achieve the optimum in operating characteristics using the least amount of fuel.

Inasmuch as the present invention is subject to many modifications, variations and changes in detail, it is intended that all matter contained in the foregoing description or shown in the accompanying drawings be interpreted as illustrative and not in a limiting sense.

What is claimed is:

1. A system for determining and controlling the power being transmitted through a rotated shaft from a fuel consuming engine, comprising:

first means mounted on said shaft for generating a direct current signal having a magnitude proportional to torque transmitted through said shaft and a polarity corresponding to torque direction, said first means including a husk assembly clamped about said shaft and a linear variable differential transformer carried on said husk assembly;

second means coupled with said husk assembly for generating a direct current signal having a magnitude proportional to shaft rotational speed and a polarity corresponding to rotation direction;

electronic circuit means having first and second inputs connected to receive said generated direct current signals from said first and second means, respectively, and an output; said circuit means electronically multiplying said signals to produce a direct current signal at said output proportional in magnitude and polarity to the product of said first and second input signals whereby said direct current output signal is linearly representative of the horsepower being transmitted through said shaft in either forward or reverse directions;

flowmeter means for determining the rate of fuel being consumed by the engine in the transmission of power through said shaft and providing a direct current output signal representative thereof;

divider means connected to said circuit means and said flowmeter means for electronically dividing the output signal of said flowmeter means by the output signal of said circuit means whereby a direct current signal representative of specific fuel rate and instantaneous efficiency is provided;

display means coupled to said divider means and responsive to said direct current signal for providing a visually perceptible output of specific fuel rate and instantaneous efficiency;

first control means having an input connected to receive said generated direct current signal from said second means, and an output coupled to said engine; said first control means producing a variable direct current signal at said output for maintaining the rotational speed of said engine at a preselected value; and second control means having an input connected to receive said generated direct current signal from said first means, and an output coupled to said engine; said second control means producing a variable direct current signal at said output for maintaining the torque transmitted through said shaft at a preselected value, whereby both rotational speed and torque may be set and maintained at preselected values to produce a direct current signal at the output of said divider means representing maximum instantaneous efficiency.

2. The system as recited in claim 1 wherein said first control means comprises a buffer amplifier having inputs connected to receive said direct current signal from said second means, and an output coupled to supply a feedback signal representative of shaft speed to a speed control input of said engine for automatic control of said engine.

3. The system as recited in claim 2 wherein said first control means further comprises RPM comparator means connected to receive said direct current signal from said second means and producing as an output an on-off engine speed control signal in response to said signal from said second means exceeding a preselected reference signal.

4. The system as recited in claim 3 wherein said RPM comparator means comprises a differential amplifier, means providing a variable reference signal to a first input of said differential amplifier, unidirectional polarity output bridge rectifier means coupling said direct current signal from said second means to a second input of said differential amplifier, and a semiconductor switch having a control input connected to an output of said differential amplifier.

5. The system as recited in claim 3 wherein said first control means further includes overspeed indicator means connected to receive the output of said RPM comparator means for producing an alarm indication in response to said comparator output.

6. The system as recited in claim 5 wherein said overspeed indicator means includes switch means responsive to said RPM comparator output for actuating an alarm device; and wherein said RPM comparator means includes a potentiometer connected to said first input of said differential amplifier to enable preselection of said reference signal.

7. The system as recited in claim 6 wherein said switch means comprises a diode-protected relay, and wherein said alarm device comprises a lamp.

8. The system as recited in claim 1 wherein said second control means comprises a buffer amplifier having inputs connected to receive said direct current signal from said first means, and an output coupled to supply a feedback signal representative of torque transmitted through said shaft to a torque control input of said engine for automatic control of said engine.

9. The system as recited in claim 8 wherein said second control means further comprises torque comparator means connected to receive said direct current signal from said first means and producing as an output an on-off engine torque control signal in response to said signal from said first means exceeding a preselected threshold.

10. The system as recited in claim 9 wherein said torque comparator means comprises a differential amplifier, means providing a variable threshold signal to a first input of said differential amplifier, unidirectional polarity output bridge rectifier means coupling said direct current signal from said first means to a second input of said differential amplifier, and a semiconductor switch having a control input connected to an output of said differential amplifier.

11. The system as recited in claim 1 further including reverse torque indicating means connected to receive the output signal of said first means for producing an alarm indication in response to said signal having a negative polarity; said reverse torque indicating means comprising a semiconductor switch and an amplifier connected to change the conductivity state of said switch in response to a change in polarity in the output of said first means.

12. A system for determining and controlling the power being transmitted through a rotated shaft from a fuel-consuming engine, comprising:
   first means on said shaft for generating a signal representative of torque transmitted through said shaft;
   second means on said shaft for generating a signal representative of shaft rotational speed;
   third means multiplying said signals from said first and second means to produce a signal representative of the horse-power being transmitted through said shaft;
   fourth means coupled to the engine for producing a signal representative of the rate of fuel consumed in the transmission of power through said shaft;
   fifth means dividing the signal from said fourth means by the signal from said third means to produce a signal representative of specific fuel rate, reflecting instantaneous engine efficiency;
   sixth means coupled to said fifth means and responsive to the signal from said fifth means for providing a visually perceptible output of specific fuel rate and instantaneous efficiency;
   seventh means coupled to receive said signal from said first means for producing a variable feedback signal for controlling engine torque; and
   eighth means coupled to receive said signal from said second means for producing a variable feedback signal for controlling engine speed, whereby engine speed and torque operating parameters may be controlled and specific fuel rate may be monitored so as to maximize fuel efficiency.

* * * * *